United States Patent
Gilgen

Patent Number: 6,156,361
Date of Patent: Dec. 5, 2000

[54] METHOD FOR TREATING A FOOD PRODUCT

[75] Inventor: John F. Gilgen, Fort Mill, S.C.

[73] Assignee: Remac, Inc., Fort Mill, S.C.

[21] Appl. No.: 08/123,144

[22] Filed: Sep. 17, 1993

[51] Int. Cl.[7] .............................. A23B 9/16; A23L 1/36
[52] U.S. Cl. .............................. 426/302; 426/89; 426/93; 426/96; 426/289; 426/310; 426/441; 426/541; 426/632
[58] Field of Search .................... 426/93, 89, 96, 426/289, 295, 302, 310, 543, 541, 632, 441

[56] References Cited

U.S. PATENT DOCUMENTS

| | | |
|---|---|---|
| 1,307,090 | 6/1919 | Dunham . |
| 2,218,713 | 10/1940 | Kelly et al. . |
| 2,631,938 | 3/1953 | Miers et al. . |
| 2,742,364 | 4/1956 | Neumann . |
| 3,314,800 | 4/1967 | Noznick et al. . |
| 3,671,266 | 6/1972 | Cooper et al. . |
| 4,161,545 | 7/1979 | Green et al. . |
| 4,206,246 | 6/1980 | Mamahit ................................ 426/507 |
| 4,214,007 | 7/1980 | Hase et al. . |
| 4,501,758 | 2/1985 | Morris . |
| 4,515,820 | 5/1985 | Tang . |
| 4,522,833 | 6/1985 | Sharma . |
| 4,597,973 | 7/1986 | Moore . |
| 4,647,463 | 3/1987 | Hoover .................................. 426/632 |
| 4,692,342 | 9/1987 | Gannis et al. . |
| 4,822,625 | 4/1989 | Gannis et al. . |
| 4,826,698 | 5/1989 | Reznik .................................. 426/320 |
| 4,828,858 | 5/1989 | Holloway, Jr. et al. . |
| 4,910,028 | 3/1990 | Bernacchi et al. . |
| 5,061,499 | 10/1991 | Holloway, Jr. et al. . |
| 5,094,874 | 3/1992 | Zook . |
| 5,208,058 | 5/1993 | Kotani et al. ........................ 426/632 |
| 5,240,726 | 8/1993 | Zook et al. .......................... 426/611 |

OTHER PUBLICATIONS

G.G. Hawley. 1981. Condensed Chemical Dictionary. Van Nostrand Reinhold Company. p. 1029.

Primary Examiner—Anthony J. Weier
Attorney, Agent, or Firm—Kennedy Covington Lobdell & Hickman LLP

[57] ABSTRACT

A method for treating a food product, especially nuts, for increased shelf life includes soaking the food product in a solution of anti-oxidant substance and oil, water, or an aqueous oil solution, mixing the nuts with a coating mixture in a reduced pressure air environment, replacing the air with nitrogen gas. The nuts may then be removed from the nitrogen and allowed to dry.

24 Claims, 2 Drawing Sheets

METHOD FOR TREATING A FOOD PRODUCT

BACKGROUND OF THE INVENTION

The present invention relates broadly to a methods for treating food products to increase their usable shelf life and, more particularly, to a method for treating nuts in a vacuum to remove substantially all the oxygen therefrom while leaving the nut meat in a flavorful, edible condition, and a nut thusly treated. The treated nuts may then be stored, roasted, baked, or otherwise processed for packaging and shipping.

Nuts, like other organic food matter, have a definite shelf life after which time the nuts may become spoiled beyond an edible condition. This problem is particularly acute with walnuts, pecans, and other relatively expensive nuts. For example, pecans have a shelf life of approximately six months which can be extended through the use of cold storage. Further, the nuts may be coated with honey, sugar, other flavoring, spice, or seasoning which can enhance the flavor yet increase the rate of spoilage.

U.S. Pat. No. 2,631,938 to Miers et al teaches coating peanuts with an anti-oxidant to reduce the spoilage. This technique extends the shelf life of nuts, yet spoilage eventually occurs.

U.S. Pat. No. 2,218,713 to Kelly et al teaches sealing peanuts in their shells while maintaining the in-shell environment at a reduced pressure to retard spoilage. This technique works reasonably well yet is confined to shelled nuts and does not provide for nuts sold outside of their shell such as walnuts or pecans.

As previously mentioned, it is known to coat nuts with flavoring. For example, U.S. Pat. No. 4,501,758 to Moore teaches soaking nuts in an aqueous solution to form an adhesive, then coating the nuts with a dry powder-like honey-containing mixture for flavoring.

While the above-discussed patents teach various ways of enhancing flavor and shelf life of certain types of edible nuts, it remains desirable to further increase the shelf life of unshelled nuts which may or may not be coated with flavoring.

SUMMARY OF THE INVENTION

It is accordingly an object of the present invention to provide a method for treating a food product, particularly nuts, for increasing the usable shelf life of the product which addresses the above-identified concerns.

According to the preferred embodiment of the present invention, a method for treating a food product, preferably nuts, for increased shelf life includes the steps of providing a predetermined quantity of a food product for treatment, mixing an anti-oxidant substance with a heated liquid to form a treatment solution, and soaking the food product in the treatment solution until the food product has absorbed a predetermined amount of the treatment solution. Then, the food product is removed from the treatment solution. Next, a predetermined amount of a coating mixture is provided. The food product and the coating mixture are then placed in a pressure vessel. The pressure within the pressure vessel is then reduced to a value of less than one atmosphere and, preferably, to a value of 0.84 atmospheres.

The food product and the coating mixture is then mixed at the reduced pressure value until the food product has retained a predetermined amount of the coating material on the surface thereof. The pressure inside the pressure vessel is then increased to a pressure value of approximately one atmosphere. A predetermined quantity of nitrogen gas is then injected into the pressure vessel to replace the air therein, and the nuts are allowed to dry. The coated food product is then removed from the pressure vessel for further processing, packaging, or storage.

It is preferred that the step of mixing an anti-oxidant with a heated liquid includes mixing the anti-oxidant with heated water. Alternatively, the heated liquid could comprise heated oil or a solution of heated water and oil. It is further preferred that the step of mixing an anti-oxidant with a heated liquid includes mixing a predetermined quantity of tocopherol with the heated liquid.

Preferably, the step of providing a predetermined amount of a coating material includes providing a predetermined amount of dried, flavored material, which may be a dried honey-containing mixture, sugar, or other flavor enhancing confection. Further, the present invention includes an edible nut treated for increased shelf life according to the above-discussed method.

In an alternate embodiment of the present invention, the method for treating pecans for increased shelf life includes the steps of providing a predetermined amount of pecans, mixing a predetermined amount of anti-oxidant substance and a predetermined amount of edible oil to form a treatment solution. The pecans and the treatment solution are then placed into a pressure vessel. The pressure within the pressure vessel is then reduced to a predetermined pressure value that is less than one atmosphere. The pecans and the treatment solution are then mixed at the reduced pressure value. Finally, the pressure inside the pressure vessel is increased to a pressure value of approximately one atmosphere and the pecans are removed from the pressure vessel for further processing, storage, or packaging.

By the above, a method for treating edible nuts, especially pecans, is provided which substantially increases the shelf life of nuts thusly treated.

DESCRIPTION OF THE PREFERRED EMBODIMENT

Nuts, such as walnuts, pecans, or other tree nuts, are popular as both a snack food and for use in cooking. Raw nuts can be coated with flavored dried material such as a honey-containing mixture or spices, seasonings, sugar, or other flavor enhancers to provide a tasty snack. However, like other food products, nuts have a distinct shelf life, after the passage of which spoilage can give the nuts a foul taste or render them completely inedible. Pecans are a popular nut which, like other nuts, are susceptible to spoilage. Pecans are premium nut demanding a higher cost than, for example, peanuts, and are especially popular in cooking. Adding to the cost of pecans is the necessity for cold storage, such as freezing, to keep pecans fresh and ready for use. Typically, pecans can be kept six months or longer if cold storage is employed.

Other nuts, such as brazil nuts, cashews, almonds, or walnuts may be coated with the aforesaid flavor enhancing mixture and are then typically baked or roasted to provide nut-based snack food products which are typically packaged in small quantities and sold as such.

The present invention provides a method for increasing the shelf life of food products, particularly nuts, which can be accomplished relatively easily in the nut production process prior to cooking or storage. Preferably, the nuts are coated, however, an alternative embodiment of the present invention provides a method for treating uncoated pecans.

Figure 1:
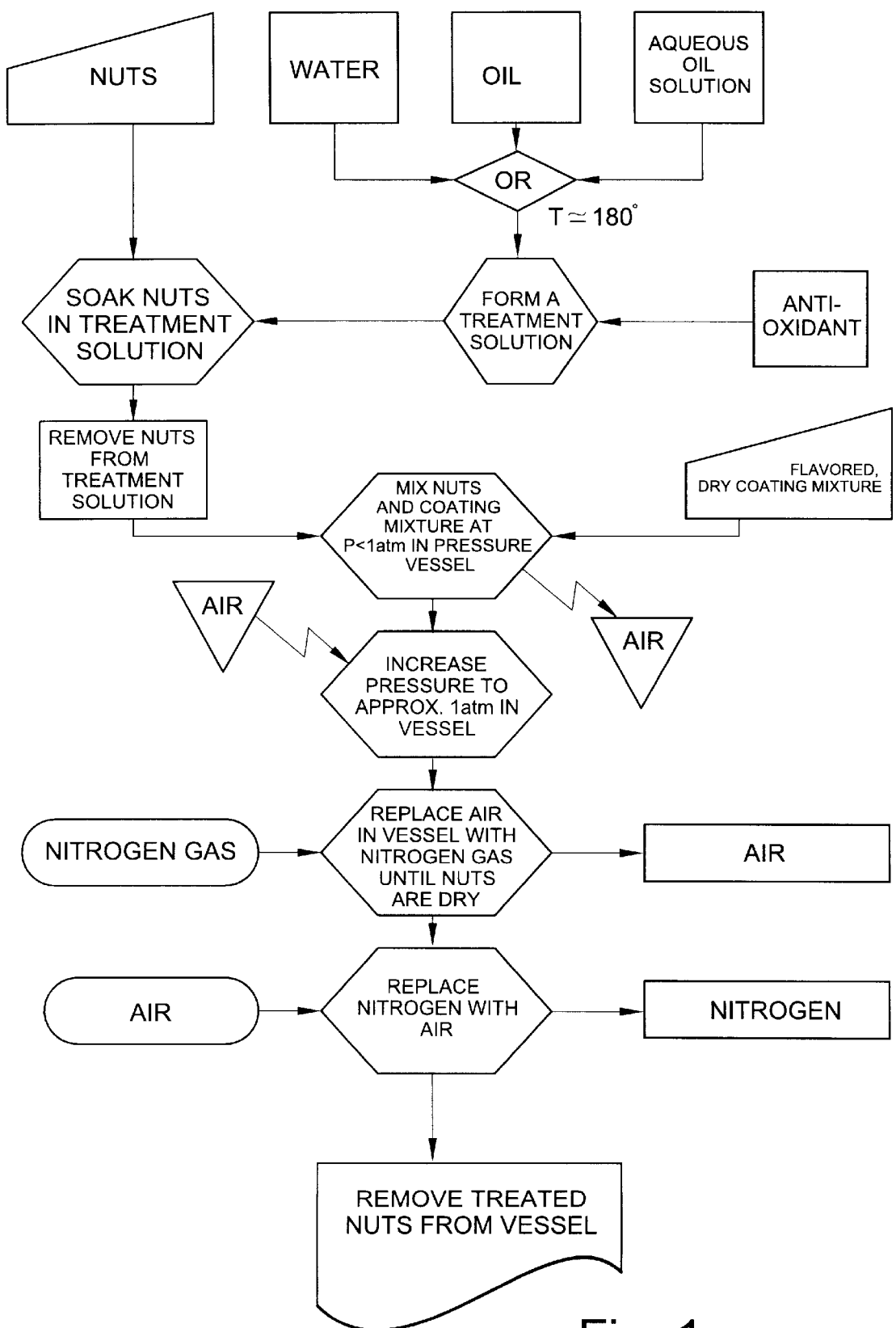
FIG. 1 is a flow chart illustrating a method for treating a food product for increased shelf life according to the preferred embodiment of the present invention.

With reference to FIG. 1, a plurality of nuts is provided for treatment. Initially, a treatment solution is mixed by mixing a quantity of anti-oxidant, preferably tocopherol, with either heated water at 180° F., oil, or an aqueous solution of oil. The preferred concentration of tocopherol is approximately 200 parts per million in oil, including the oil content of the nuts to be treated which may be determined in a known manner. The nuts are then soaked in the treatment solution which acts to open the surface cells of the nuts and to provide an adhesive for the upcoming coating mixture.

While the nuts soak in the treatment solution, a coating mixture may be prepared. The coating may be either a honey-containing mixture, sugar, spice, seasonings, or other nut compatible flavorings. However, for proper treatment, the coating mixture should be in dry powder form.

The equipment necessary to treat the nuts according to the method of the present invention should be available to those skilled in the art. Particularly, a vessel is required which is sealed against the atmospheric pressure and which may be rotated or otherwise agitated for mixing. A vacuum pump is attached to the vessel for reducing the pressure therein. The nuts, along with the dry coating mixture, are placed in the pressure vessel and it is sealed to the atmosphere. The vacuum pump is activated which reduces the pressure inside the pressure vessel to a value of approximately 0.84 atms (25.00 in Hg). The pressure in the vessel need not be exactly as stated, yet it should be sufficiently below one atmosphere (29.92 in Hg) so that the amount of oxygen available to the nut is reduced. The lower the pressure within the pressure vessel, the less oxygen available to the nut, so that correspondingly less efficiency is required of the anti-oxidant to treat the nut. Once the nuts are in their reduced pressure chamber, the chamber is rotated or otherwise agitated to provide a thorough mixing of the nuts and the coating material.

Once the nuts are thoroughly coated, the air in the vessel is returned to approximately atmospheric pressure and the air is then replaced with nitrogen gas to purge any remaining oxygen from the pressure vessel. Once the nuts are dry, they may be removed from the pressure vessel and then further processed by, for example, baking at 300° for 8 to 10 minutes or roasting at oil at 350° for 3 to 5 minutes. The nuts may then be packaged for shipment.

Figure 2:
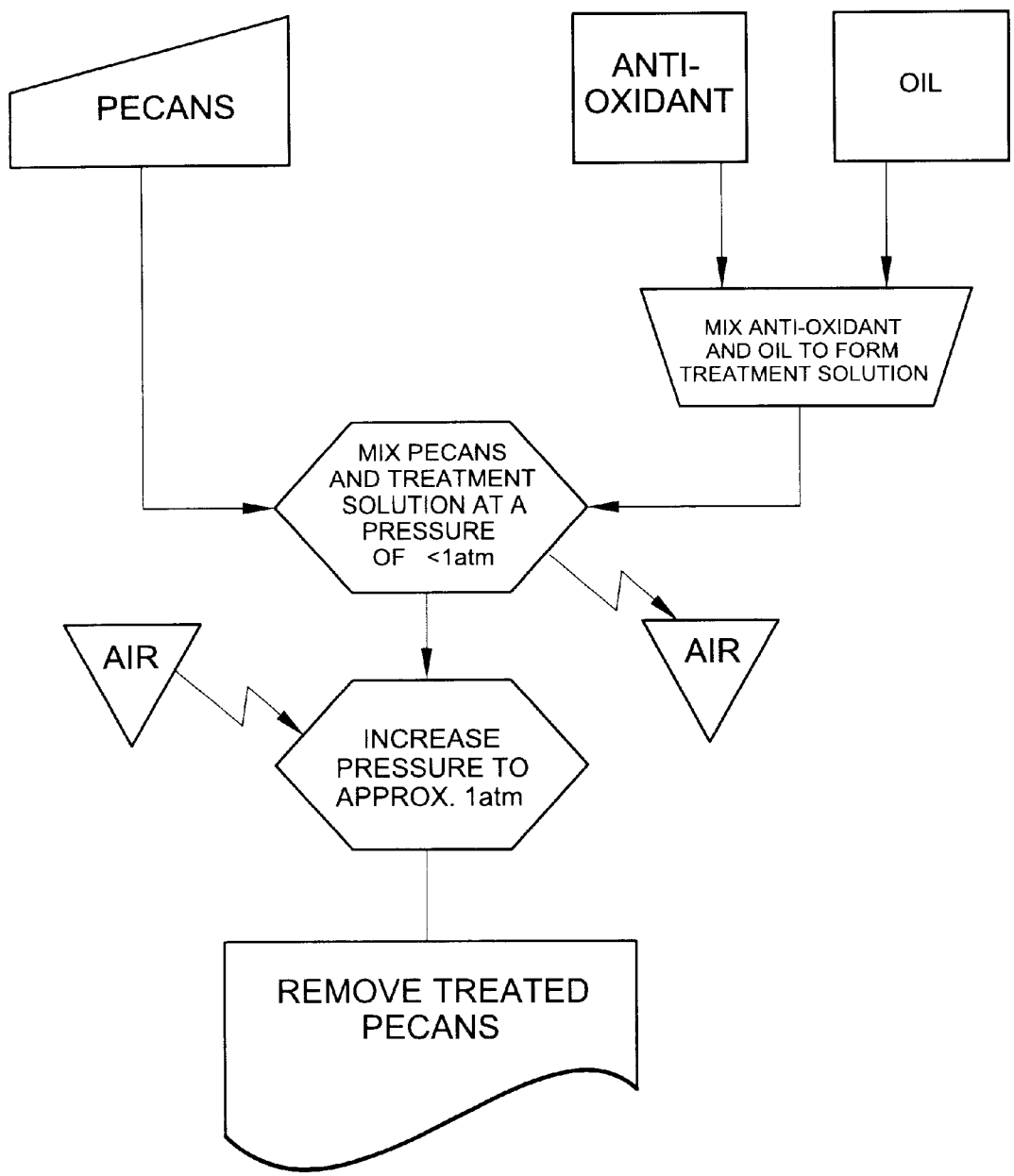
FIG. 2 is a flow chart of a method for treating pecans according to an alternate embodiment of the present invention.

In an alternate embodiment of the present invention, pecans may be treated in an uncoated manner. With reference to FIG. 2, a treatment solution of oil and an anti-oxidant material such as tocopherol is placed in the pressure vessel along with the pecans to be treated. Pressure within the vessel is then reduced using the vacuum pump to a value of approximately 0.84 atm (25 in Hg). The vessel is then rotated or otherwise agitated to mix the pecans with the treatment solution at the reduced pressure. Once mixing has occurred, the pecans are removed from the pressure vessel in a treated state and are ready for storage. The above method of treating pecans virtually eliminates the need for cold storage and its attendant cost.

By the above, a process for treating nuts to increase their usable shelf life is provided which reduces the storage facilities required and is relatively inexpensive and simply to perform.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A method for treating a food product for increased shelf life, said method comprising the steps of:

providing a predetermined quantity of a food product for treatment;

mixing an anti-oxidant substance with a heated liquid to form a treatment solution;

soaking the food product in said treatment solution until the food product has absorbed a predetermined amount of said treatment solution;

removing the food product from said treatment solution;

providing a predetermined amount of a coating material;

placing the food product and said coating material in a pressure vessel;

reducing the pressure inside said pressure vessel to a predetermined pressure value which is less than one atmosphere;

mixing the food product and said coating mixture at said reduced pressure value until the food product has retained a predetermined amount of said coating material on a surface thereof;

increasing the pressure in said pressure vessel to a pressure value of approximately one atmosphere;

injecting a predetermined quantity of nitrogen gas into said pressure vessel substantially to replace the air therein; and removing the coated food product from said pressure vessel.

2. A method for treating a food product for increased shelf life according to claim 1 wherein the step of providing a predetermined quantity of a food product includes providing a predetermined quantity of edible nuts.

3. A method for treating a food product for increased shelf life according to claim 2 wherein the step of providing a predetermined quantity of edible nuts includes providing a predetermined quantity of pecans.

4. A method for treating a food product for increased shelf life according to claim 2 wherein the step of mixing an anti-oxidant substance with a heated liquid includes mixing an anti-oxidant substance with heated water.

5. A method for treating a food product for increased shelf life according to claim 2 wherein the step of mixing an anti-oxidant substance with a heated liquid includes mixing an anti-oxidant substance with heated oil.

6. A method for treating a food product for increased shelf life according to claim 2 wherein the step of mixing an anti-oxidant substance with a heated liquid includes mixing an anti-oxidant substance with a solution of heated water and oil.

7. A method for treating a food product for increased shelf life according to claim 2 wherein the step of mixing an anti-oxidant substance with a heated liquid includes mixing a predetermined quantity of tocopherol with said heated liquid.

8. A method for treating a food product for increased shelf life according to claim 1 wherein the step of providing a predetermined amount of a coating material includes providing a predetermined amount of dried flavored material.

9. A method for treating a food product for increased shelf life according to claim 1 wherein the step of reducing the pressure inside said pressure vessel includes reducing the pressure to a value of approximately 0.84 atm.

10. A method for treating edible nuts for increased shelf life, said method comprising the steps of:

providing a predetermined quantity of edible nuts for treatment;

mixing an anti-oxidant substance substance with a heated liquid to form a treatment solution;

soaking the nuts in said treatment solution until the nuts have absorbed a predetermined amount of said treatment solution;

providing a predetermined amount of edible dried flavored material;

placing said nuts and said flavored material in a pressure vessel;

reducing the pressure inside said pressure vessel to a value which is less than one atmosphere;

mixing said nuts and said flavored material at said reduced pressure value until said nuts have retained a predetermined amount of said flavored material on a surface thereof;

increasing the pressure inside said pressure vessel to a pressure value of approximately one atmosphere;

injecting a predetermined amount of nitrogen gas into said pressure vessel to substantially replace the air therein; and removing the coated nuts from the pressure vessel.

11. A method for treating a food product for increased shelf life according to claim 10 wherein the step of providing a predetermined quantity of edible nuts includes providing a predetermined quantity of pecans.

12. A method for treating a food product for increased shelf life according to claim 10 wherein the step of mixing an anti-oxidant substance with a heated liquid includes mixing an anti-oxidant substance with heated water.

13. A method for treating a food product for increased shelf life according to claim 10 wherein the step of mixing an anti-oxidant substance with a heated liquid includes mixing an anti-oxidant substance with heated oil.

14. A method for treating a food product for increased shelf life according to claim 10 wherein the step of mixing an anti-oxidant substance with a heated liquid includes mixing an anti-oxidant substance with a solution of heated water and oil.

15. A method for treating a food product for increased shelf life according to claim 10 wherein the step of mixing an anti-oxidant substance with a heated liquid includes mixing a predetermined quantity of tocopherol with said heated liquid.

16. A method for treating a food product for increased shelf life according to claim 10 wherein the step of reducing the pressure inside said pressure vessel includes reducing the pressure to a value of approximately 0.84 atm.

17. A method of treating pecans for increased shelf life comprising the steps of:

providing a predetermined amount of pecans;

mixing a predetermined amount of an anti-oxidant substance substance and a predetermined amount of edible oil to form a treatment solution;

placing said pecans and said treatment solution into a pressure vessel;

reducing the pressure in said pressure vessel to a predetermined pressure value that is less than one atmosphere;

mixing said pecans and said treatment solution at said reduced pressure value;

increasing the pressure inside the pressure vessel to a pressure value of approximately one atmosphere;

removing said treated pecans from said pressure vessel.

18. An edible nut treated for increased shelf life according to a method comprising the steps of:

providing a predetermined quantity of edible nuts for treatment;

mixing an anti-oxidant substance with a heated liquid to form a treatment solution;

soaking the nuts in said treatment solution until the nuts have absorbed a predetermined amount of said treatment solution;

providing a predetermined amount of edible dried flavored material;

placing said nuts and said flavored material in a pressure vessel;

reducing the pressure inside said pressure to a value which is less than one atmosphere;

mixing said nuts and said flavored material at said reduced pressure value until said nuts have retained a predetermined amount of said flavored material on a surface thereof;

increasing the pressure inside said pressure vessel to a pressure value less than one atmosphere;

injecting a predetermined amount of nitrogen gas into said pressure vessel to substantially replace the air therein; and removing the coated nuts from the pressure vessel.

19. An edible nut product according to claim 11 wherein the step of providing a predetermined quantity of edible nuts includes providing a predetermined quantity of pecans.

20. An edible nut product according to claim 12 wherein the step of mixing an anti-oxidant substance with a heated liquid includes mixing an anti-oxidant substance with heated water.

21. An edible nut product according to claim 13 wherein the step of mixing an anti-oxidant substance with a heated liquid includes mixing an anti-oxidant substance with heated oil.

22. An edible nut product according to claim 14 wherein the step of mixing an anti-oxidant substance with a heated liquid includes mixing an anti-oxidant substance with a solution of heated water and oil.

23. An edible nut product according to claim 15 wherein the step of mixing an anti-oxidant substance with a heated liquid includes mixing a predetermined quantity of tocopherol with said heated liquid.

24. An edible nut product according to claim 16 wherein the step of reducing the pressure inside said pressure vessel includes reducing the pressure to a value of approximately 0.84 atm.

* * * * *